(No Model.)

M. SMITH.
LAMP LIGHTER.

No. 412,425.  Patented Oct. 8, 1889.

Witnesses.
Jacob P. Miller
Chas. Schwartz

Inventor.
Mortimer Smith

UNITED STATES PATENT OFFICE.

MORTIMER SMITH, OF GERMANTOWN, NEW YORK.

LAMP-LIGHTER.

SPECIFICATION forming part of Letters Patent No. 412,425, dated October 8, 1889.

Application filed February 20, 1889. Serial No. 300,623. (No model.)

*To all whom it may concern:*

Be it known that I, MORTIMER SMITH, a citizen of the United States, residing at Germantown, in the county of Columbia and State of New York, have invented a new and useful Lamp-Lighting Implement, of which the following is a specification.

The design of the implement is to light kerosene-lamps without removing the shades or chimneys. This is attained by means of a device as shown in the accompanying drawings, which is a match-strike connected with a lighted match-holder, by which the match after being lighted is passed through the tops of the chimneys to the wicks.

Figure 1:
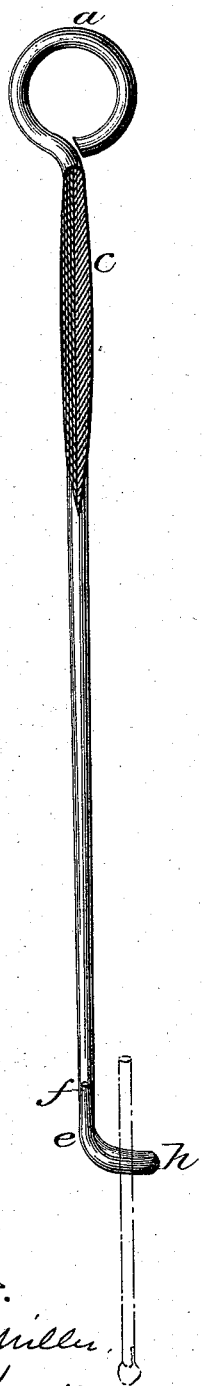
Figure 2:

In the accompanying drawings, Figure 1 is a front view, and Fig. 2 a view at right angles thereto.

At the top is the loop $a$, formed at the end of the implement, which is from eight to twelve inches long and from an eighth to three-eighths of an inch in thickness. This loop is for holding the implement or hanging it by when not in use. Next to this is the match-strike $c$, which is formed by a slight groove with V-shaped ribs. At the other end of the implement is the holder $e$, which is formed by folding the material about an inch from the end. This fold is left open at its entrance $f$ from an eighth to a quarter of an inch and decreases toward the end $h$ until almost closed, so as to hold firmly friction-matches of different sizes. The fold is also bent at its middle, as seen at $e$, Fig. 1, to allow the match when placed into it to proceed on a straight line with the implement.

What I claim as my invention, and desire to secure by Letters Patent, is—

A lighting implement consisting of a stem provided with V-shaped ribs $c$, and at one end having a loop $a$ and at the other end a holder $e$, substantially as described.

MORTIMER SMITH.

Witnesses:
JACOB P. MILLER,
CHARLES SCHWARTZ.